April 7, 1931.  C. H. SCHOENBURG  1,799,650
OUTBOARD MOTOR SUPPORT FOR VEHICLES
Filed May 21, 1930
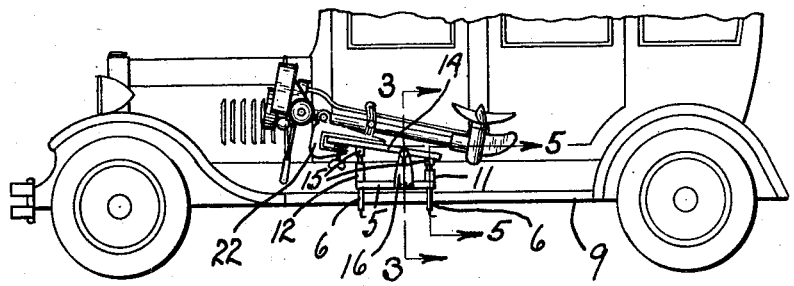
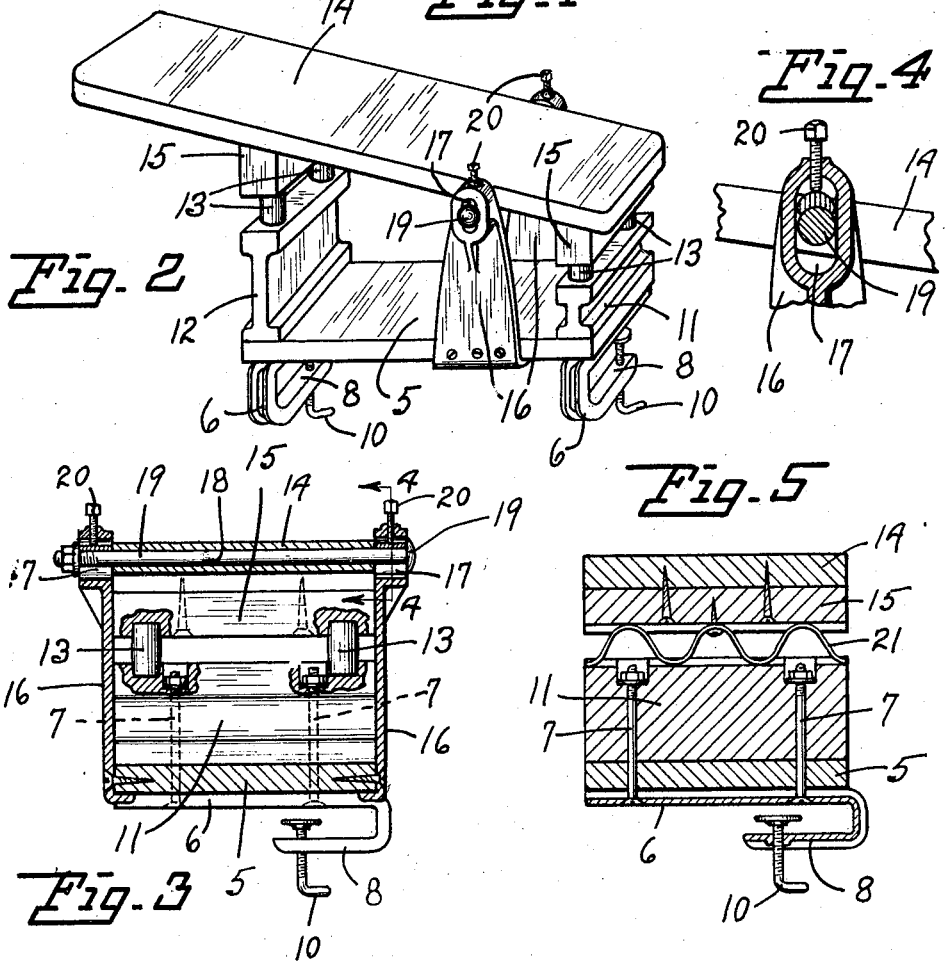
Inventor
Carl H. Schoenburg
By Glenn L. Fish
Attorney Patented Apr. 7, 1931

1,799,650

UNITED STATES PATENT OFFICE

CARL H. SCHOENBURG, OF SPOKANE, WASHINGTON, ASSIGNOR OF ONE-THIRD TO FRED G. SCHOENBURG AND ONE-THIRD TO CARL E. SCHOENBURG, BOTH OF SPOKANE, WASHINGTON

OUTBOARD MOTOR SUPPORT FOR VEHICLES

Application filed May 21, 1930. Serial No. 454,307.

My invention relates to outboard motor supports for vehicles and certain objects of the invention are to provide a support adapted to be detachably secured to the running board of a motor vehicle for conveniently carrying outboard motors that are somewhat unwieldy to transport without resulting damage. Further objects of the invention are to provide a support having novel resilient means for absorbing shocks of the vehicle and thus preventing damage to the outboard motor, novel means for pivotally connecting the top support board with the base board intermediately of the resilient or shock absorbing means, and novel adjustable means for the pivotal connecting means.

With the above and other objects in view which will appear as the description proceeds, the invention consists of the novel construction, adaptation, combination and arrangement of parts hereinafter described and claimed. These objects are accomplished by devices illustrated in the accompanying drawings, wherein:—

Figure 1 is a view in side elevation showing the device installed on the running board of an automobile with an outboard motor supported thereon;

Fig. 2 is a view in perspective of the device;

Fig. 3 is a view in transverse vertical section taken substantially on a broken line 3, 3 of Fig. 1;

Fig. 4 is a detail view in vertical section taken on a broken line 4, 4 of Fig. 3 and showing the pivotal and adjustable bracketed connection for the top support board; and Fig. 5 is a view in transverse vertical section showing a modified resilient connecting means between the top support and base boards.

Referring to the drawings throughout which like reference numerals indicate like parts, the numeral 5 designates a base board having a clamp 6 secured to either under end portion thereof by means of bolts 7. The hooked ends 8 of said clamps are adapted to engage under the running board 9 of an automobile and jack screws 10 are arranged to detachably secure said clamp members to said running board as will be understood.

The bolts 7 extend upwardly through a relatively low transverse upstanding support 11 at the rear end of the base board 5 and through a relatively high standard support 12 at the forward end of said base board thus securing said upstanding members to the base board. Two holes are provided in the tops of said upstanding members and upwardly projecting rubber cushion members 13 are set in said holes.

A relatively thick top support board 14 has two transverse blocks 15 secured to its underside, by screws or the like, in spaced relation corresponding with the upstanding members 11 and 12, and the undersides of said blocks are provided with holes arranged to receive the rubber members 13. Brackets 16 are secured to the sides of the base board 5 intermediately of the upstanding members and their upper ends are provided with vertically arranged oblong slots 17.

The top board 14 is provided with a transverse hole 18 disposed in the vertical plane with the oblong slots 17. When said top board is installed in place said transverse is normally disposed slightly above said slots and may be made to register therewith by exerting pressure on said top board. A long bolt 19 is then installed through said hole and slots and when the pressure on the top board is released the rubber members 13 will expand and raise the top board until the long bolt engages the top of the oblong slots.

It will thus be obvious that the foregoing arrangement provides means whereby the top support board 14 is detachably locked in place. This arrangement also provides restrained pivotal means for said top board whereby the shocks of the vehicle on which the device is installed, in addition to being absorbed, are shifted back and forth between the rubber cushions 13. Set screws 20 are installed in the heads of the brackets 16 to engage the bolt 19 whereby the spring bearing tension for the top support board may be regulated as desired.

For supporting heavy outboard motors it is, of course, desirable to increase the spring bearing tension of the top support board 14. In Fig. 5 a convoluted spring 21 is substituted for the rubber cushions 13. In mounting the outboard motor on the device its clamp member 22, which is ordinarily used to secure the motor to the back board of a boat, is secured to the forward projecting or raised end portion of the top board, as shown in Fig. 1, with its engine, fuel tank and tiller projecting over said forward end and its propeller projecting over the remote or lower end of said top board.

Having thus described my invention, it being understood that minor changes may be resorted to in its construction and arrangement without departing from the scope and spirit of the invention, what I claim and desire to secure by Letters Patent of the United States is:—

1. An outboard motor support for vehicles having in combination a base board adapted to be secured to the running board of a vehicle, a top support board slantingly disposed, forward and rear upstanding supports for the ends of the base board connected to the top support board, resilient members interposed in said forward and rear supports, and a pivotal bracketed connection between the base and top support boards intermediately of the upstanding supports whereby said boards are locked in place against the bearing tension of the resilient members.

2. An outboard motor support for vehicles having in combination a base board adapted to be detachably secured to the running board of a vehicle, a top support board slantingly disposed, forward and rear upstanding supports for the ends of the base board connected to the top support board, resilient means interposed in said forward and rear supports, a pivotal bracketed connection between the base and top support boards intermediately of the upstanding supports whereby said boards are locked in place against the upwardly bearing tension of the resilient means, and means for regulating the bearing tension of the resilient means for the pivotal bracketed connection.

In testimony whereof I affix my signature.

CARL H. SCHOENBURG.